No. 689,483. Patented Dec. 24, 1901.
R. R. GILMAN.
MAGNETIC ENGINE OR MOTOR.
(Application filed May 23, 1901.)
(No Model.) 2 Sheets—Sheet I.
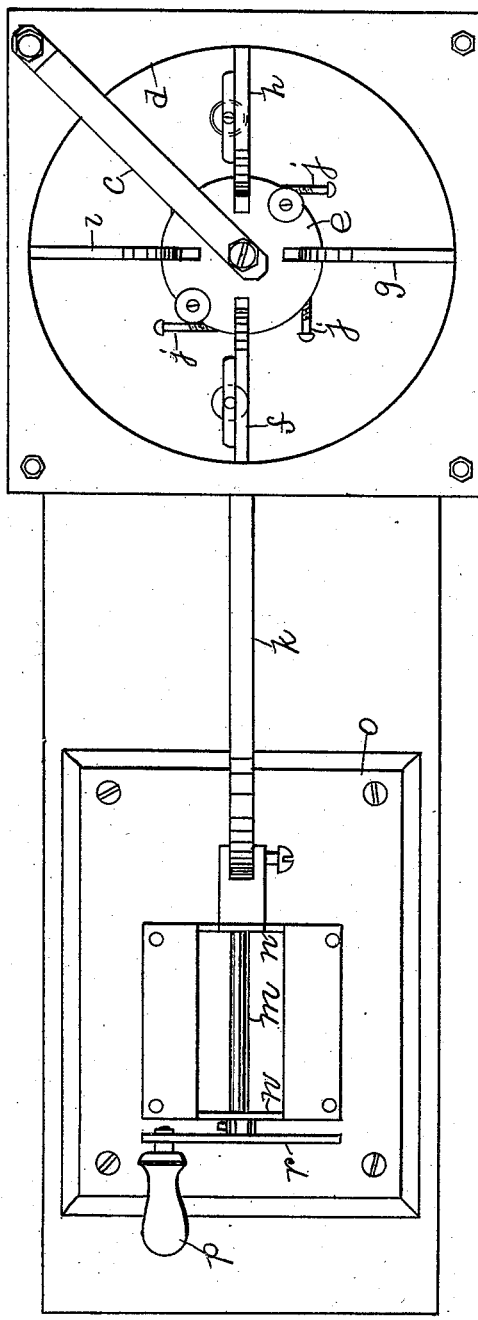
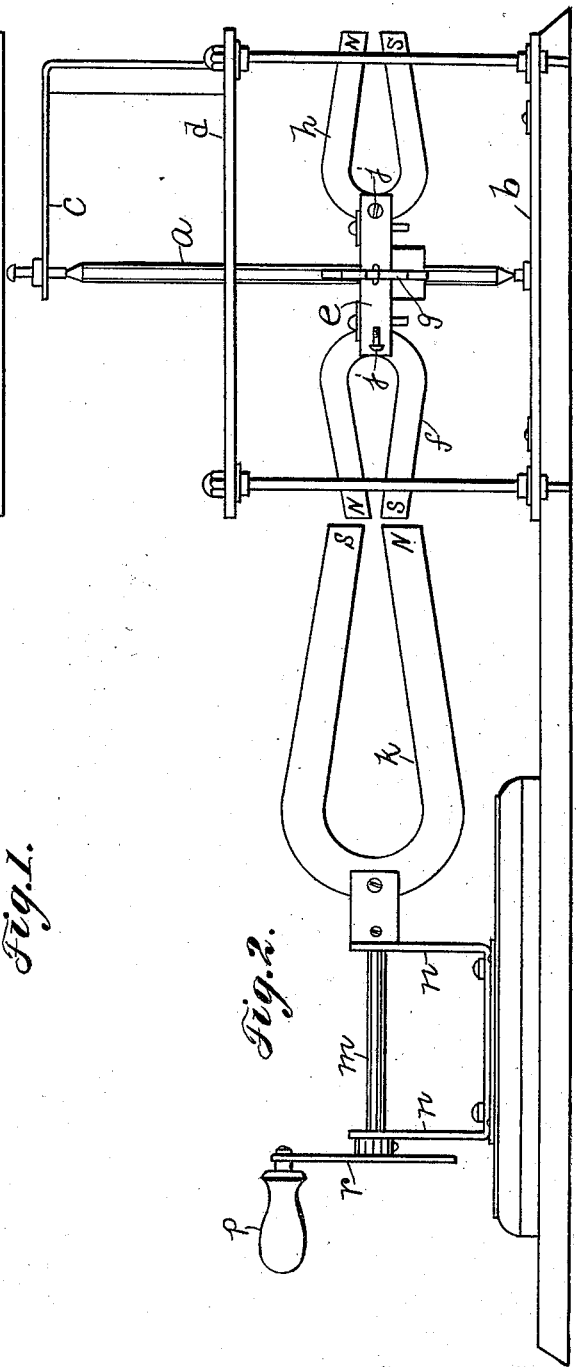
Fig. 1.
Fig. 2.
Witnesses.
Inventor.
Raymond R. Gilman
by Jas. H. Churchill
atty.

No. 689,483. Patented Dec. 24, 1901.
R. R. GILMAN.
MAGNETIC ENGINE OR MOTOR.
(Application filed May 23, 1901.)
(No Model.) 2 Sheets—Sheet 2.
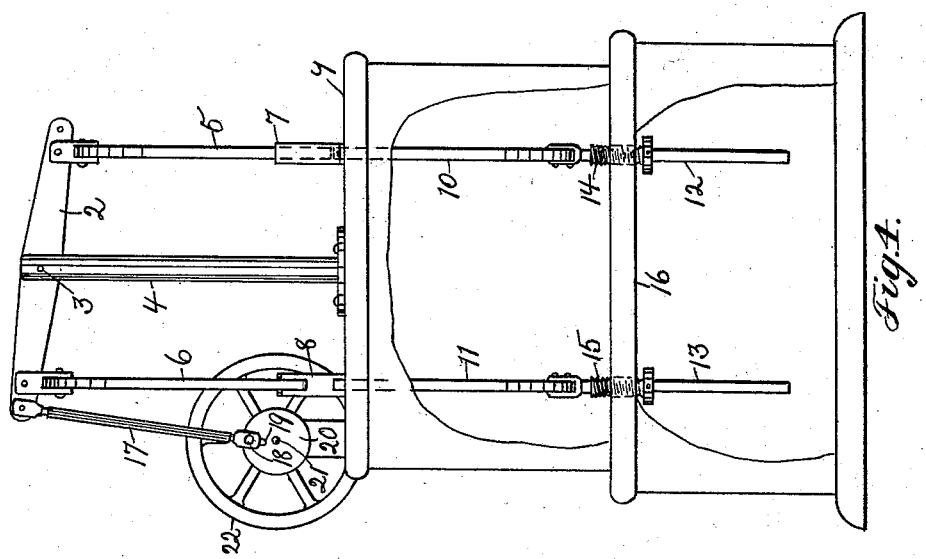
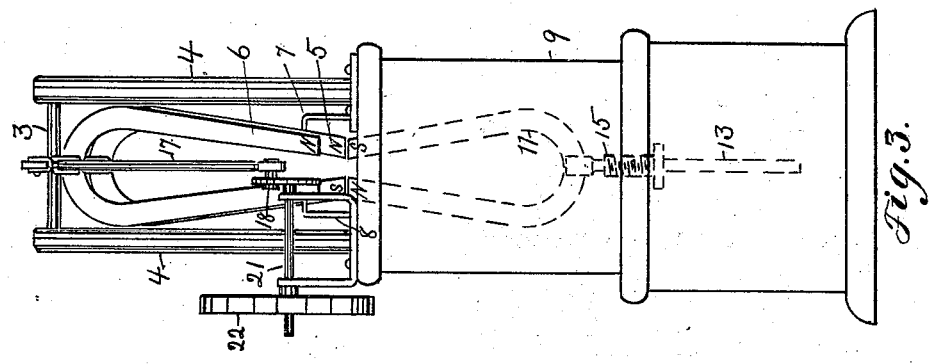
Witnesses.
C. H. Garnett
J. Murphy
Inventor.
Raymond R. Gilman
by Jas. H. Churchill
atty.

UNITED STATES PATENT OFFICE.

RAYMOND R. GILMAN, OF MELROSE, MASSACHUSETTS, ASSIGNOR OF ONE-HALF TO CHARLES J. GROVES, OF BOSTON, MASSACHUSETTS.

MAGNETIC ENGINE OR MOTOR.

SPECIFICATION forming part of Letters Patent No. 689,483, dated December 24, 1901.

Application filed May 23, 1901. Serial No. 61,494. (No model.)

*To all whom it may concern:*

Be it known that I, RAYMOND R. GILMAN, a citizen of the United States, residing in Melrose, in the county of Middlesex and State of Massachusetts, have invented an Improvement in Magnetic Engines or Motors, of which the following description, in connection with the accompanying drawings, is a specification, like characters on the drawings representing like parts.

This invention relates to a magnetic motor or engine in which a driven member is provided with one or more magnets and is actuated by a driving member provided with a movable magnet. The driven member may have imparted to it a rotary or an oscillating motion, and the driving member may be given a rotary movement, so that the poles of the magnet carried by the driving member may alternately attract and repel the poles of the magnet or magnets carried by the driven member to produce motion thereof. These and other features of this invention will be pointed out in the claims at the end of this specification.

Figure 1 is a plan view of one form of a magnetic engine or motor embodying this invention; Fig. 2, a side elevation of the engine shown in Fig. 1; Fig. 3, an end elevation of a modified engine; and Fig. 4 a side elevation, with parts broken out, of the engine shown in Fig. 3.

Referring to Figs. 1 and 2, $a$ represents a shaft having bearings in a base $b$ and an arm $c$ attached to a framework $d$. The shaft $a$ constitutes the driven member of the magnetic engine and in the present instance has fast on it a disk $e$, to which is secured a series of radially-projecting magnets, herein shown as four in number and lettered $f\ g\ h\ i$. These magnets are represented as permanent magnets and are secured to the disk $e$, as by screws $j$, so that like poles are in the same horizontal plane, and with these magnets coöperates a magnet $k$, also represented as a permanent magnet and which is carried by the driving member, which latter is shown as a rotatable shaft $m$, having bearings in suitable uprights $n$ on a base $o$. The magnet $k$ is set with its poles in a vertical plane and in close proximity to the path traveled by the poles of the permanent magnets carried by the driven member. The shaft $m$ may be rotated by power or, as represented, by means of a handle $p$ on a crank or disk $r$, and as the said shaft is rotated the permanent magnet $k$ is turned so that its poles N S will act on like poles of the magnet $f$ and repel the same, thereby forcing the magnet $f$ away from the permanent magnet $k$ and causing the shaft $a$ to be rotated.

The rotation of the shaft $a$ moves the magnet $g$ toward the magnet $k$, and as the magnet $g$ approaches the driving-magnet $k$ the latter is rotated so that one of its poles, as N, coöperates with the south pole of the magnet $g$ and attracts the latter until at or about the time the magnet $g$ is in substantially the same plane as the magnet $k$, whereupon continued rotation of the magnet $k$ presents like poles to the poles of the magnet $g$, thus causing a repelling action, which produces continued movement of the magnet $g$ and the shaft $a$.

The attracting and repelling action of the driving-magnet $k$ upon each of the driven magnets is continued as long as it is desired to rotate the shaft $a$. By rotating the driving-magnet $k$ in the reverse direction the shaft $a$ may be rotated in the reverse direction. The driven shaft may be stopped by stopping the driving-magnet $k$ with its poles opposite unlike poles of a driven magnet, as represented in Fig. 2.

In Figs. 1 and 2 I have shown the invention as embodied in an engine in which the driven member has imparted to it a rotary motion; but I do not desire to limit my invention in this respect, as it may be embodied in an engine in which the driven member is oscillated, as represented in Figs. 3 and 4, wherein the driven member is shown as a walking-beam or lever 2, mounted on a shaft or pivot-rod 3, supported in uprights 4. The lever 2 has attached to it near its opposite ends two permanent magnets 5 6, vertically movable in suitable guides 7 8, erected upon a hollow base or support 9, which contains two driving permanent magnets 10 11, secured to shafts 12 13, which are rotatively supported in suitable bearings 14 15, secured to a cross-bar or partition 16 within the hollow base or support. The driving-magnets 10 11 are arranged in substantially close proximity to the driven magnets 5 6 when the latter are in their lowermost position, and by rotating said driving-magnets their north and south poles may be brought substantially into line with unlike poles of the driven magnets 5 6 when it is desired to produce motion of the walking-beam or lever 2.

As represented in Fig. 4, the driven magnet 5 is in its lowest position in close proximity to the driving-magnet 10, whose poles are in line with or opposite unlike poles of the magnet 5. Now by rotating the shaft 12 the driving-magnet 10 is turned so that its poles are changed with relation to the poles of the magnet 5, and as said change is effected the magnet 5 is repelled by the driving-magnet, which repulsion is at a maximum when the poles of the driving-magnet are in line with like poles of the driven magnet. The repulsion of the magnet 5 elevates the end of the lever or walking-beam to which the said magnet is attached and lowers the opposite end of said lever, thereby bringing the magnet 6 nearer the driving-magnet 11, which is turned so that its poles are opposite unlike poles of the magnet 6, thereby attracting to it the magnet 6, and thus assisting by its attractive force the repelling force of the magnet 10. At or about the time the magnet 6 has reached the magnet 11 the latter is turned so as to reverse its poles with relation to the poles of the magnet 6, and thus cause the magnet 6 to be repelled, while at the same time the magnet 10 is turned to reverse its poles, and thus attract its coöperating magnet 5. In this manner an oscillatory movement is imparted to the driven member or lever 2, which movement may be converted into a rotary movement in any desired or usual manner. In the present instance this conversion is effected by means of an eccentric-rod 17 joining the lever 2 to an eccentric-pin 18, movable in a slot 19 in a disk 20, fast on a shaft 21, provided with a pulley or wheel 22.

I have herein shown a simple form of apparatus embodying my invention; but I do not desire to limit myself to the particular form of apparatus shown.

I claim—

1. In an engine or motor of the class described, the combination with a driven member provided with a permanent magnet, of a driving member provided with a permanent magnet having its poles coöperating with the poles of the magnet carried by the driven member and movable with relation thereto to produce movement of said driven member, substantially as described.

2. In an engine or motor of the class described, the combination with a driven member provided with a permanent magnet, of a rotatable driving member provided with a permanent magnet having its poles coöperating with the poles of said permanent magnet, substantially as described.

3. In an engine or motor of the class described, the combination with a rotatable driven member provided with a permanent magnet, of a movable driving member provided with a permanent magnet having its poles coöperating with the poles of the magnet carried by the driven member, substantially as described.

4. In an engine or motor of the class described, the combination with a driven member provided with a magnet, of a movable driving member provided with a magnet having its opposing poles in proximity with the magnet carried by the driven member, whereby movement of the poles of the driving-magnet produces movement of the driven magnet, substantially as described.

5. In an engine or motor of the class described, the combination with a driven member provided with a magnet having its opposing poles adjacent to one another, of a movable driving member provided with a magnet having its opposing poles adjacent to one another and normally within the influence of the poles of the driven magnet, whereby movement of the poles of the driving-magnet produces movement of the poles of the driven magnet, substantially as described.

In testimony whereof I have signed my name to this specification in the presence of two subscribing witnesses.

RAYMOND R. GILMAN.

Witnesses:
JAS. H. CHURCHILL,
J. MURPHY.